United States Patent [19]
Fontana et al.

[11] Patent Number: 5,455,323
[45] Date of Patent: Oct. 3, 1995

[54] REDUCED TG COPOLYESTERCARBONATE

[75] Inventors: Luca P. Fontana, Brasschaat, Belgium; Randall A. Reed, Mt. Vernon, Ind.

[73] Assignee: General Electric Company, Pittsfield, Mass.

[21] Appl. No.: 154,242

[22] Filed: Nov. 18, 1993

[51] Int. Cl.$^6$ .................................................. C08G 64/00
[52] U.S. Cl. .................. 528/196; 528/176; 528/190; 528/193; 528/198; 528/204
[58] Field of Search ........................... 528/196, 198, 528/204, 193, 176, 190

[56] References Cited

U.S. PATENT DOCUMENTS

| | | | |
|---|---|---|---|
| 4,446,298 | 5/1984 | Mark et al. | 528/204 |
| 4,888,400 | 12/1989 | Boden et al. | 525/462 |
| 5,021,521 | 6/1991 | Krabbenhoft et al. | 525/462 |
| 5,274,069 | 12/1993 | Vicari et al. | 528/193 |

*Primary Examiner*—James J. Seidleck
*Assistant Examiner*—Terressa Mosley

[57] ABSTRACT

A reduced glass transition temperature copolyester-carbonate which displays non-Newtonian melt behavior was synthesized by using bisphenol-A, a dicarboxylic acid and a trisphenol. The branched copolymer was obtained by interfacial phosgenation. One of the compositions described displays a Tg of about 127° C. and twice the melt flow index of a branched polycarbonate of corresponding molecular weight or intrinsic viscosity.

10 Claims, No Drawings

REDUCED TG COPOLYESTERCARBONATE

BACKGROUND OF THE INVENTION

1. Field of the Invention

The invention relates to thermoplastic resin compositions and more particularly relates to improved, blow-moldable copolyester-carbonate resins and articles molded therefrom.

2. Brief Description of the Prior Art

Aromatic copolyester-carbonate resins are a well known class of synthetic polymeric resins, generally prepared by the reaction of a polyhydric phenol with a carbonate precursor in the presence of an ester precursor; see for example U.S. Pat. No. 3,169,121. Although such resins have been found to be thermoplastically moldable under a broad range of molding conditions, only select copolyester-carbonate resin compositions are useful for blow-molding. This is due to the unique requirements of a thermoplastic resin for blow-molding operations; see for example the requirements for the branched copolyester-carbonate resins described in U.S. Pat. Nos. 4,286,083 and 4,621,132. The branched copolyester-carbonate resins differ from most thermoplastic polymers used for molding in their melt rheology behavior. Most thermoplastic polymers exhibit non-Newtonian flow characteristics over essentially all melt processing conditions. However, in contrast to most thermoplastic polymers, certain branched copolyester-carbonates prepared from dihydric phenols exhibit Newtonian flow at normal processing temperatures and shear rates below 300 reciprocal seconds.

Newtonian flow is defined as the type of flow occurring in a liquid system where the rate of shear is directly proportional to the shearing force.

Two other characteristics of molten thermoplastic polymers are considered to be significant for molding operations: melt elasticity and melt strength. Melt elasticity is the recovery of the elastic energy stored within the melt from distortion or orientation of the molecules by shearing stresses. Melt strength may be simply described as the tenacity of a molten strand and indicates the ability of the melt to support a stress. Both of these characteristics are important in extrusion blow molding, particularly in fabrication by extrusion blow molding of relatively large articles. Non-Newtonian flow characteristics tend to impart melt elasticity and melt strength to polymers thus allowing their use in blow molding fabrication.

In the conventional blow-molding operation, a tube of the heat-softened copolyester-carbonate resin may be extruded vertically into a mold. The extrudate is then pressed unto the mold surfaces with a pressurized gas flow (usually air or inert gas), shaping the heat-softened resin. As mentioned above, the successful molding of a given thermoplastic resin is dependent upon a number of factors, including the characteristics and physical properties of the heat-softened resin.

However, even though a given branched copolyester-carbonate resin may have the physical properties required for successful blow-molding, the product articles may be deficient in certain other physical properties otherwise desired. For example, the molded articles may lack a desired degree of impact strength, particularly at low temperatures. We have found that polyester-carbonate resins of a particular class are represented by a branched polyester-carbonate composition that exhibits a lowered glass transition (Tg) temperature and the shear-thinning behavior of a blow-molding grade resin. The Tg of the resin is reduced by the presence of aliphatic diester blocks; while the branching is obtained by using a particular class of trisphenol.

The non-Newtonian rheological behavior and reduced glass transition temperature of this resin has use in injection molding. An example of such an application is in molded computer and business equipment housings. These large and complex parts require materials with reduced viscosities at shear rates experienced during mold filling in the injection molding process. The compositions of the invention provide the type of rheological behavior sought in this use. The copolymers, based on bisphenol-A, an alkanedioic acid, and 1,1,1-tris-(4-hydroxyphenyl)ethane, display improved processability at lower processing temperatures as well as the typical non-Newtonian behavior of a branched polycarbonate homopolymer. Advantages include extrusion at lower temperature, reduced torque, smoother surface appearance of the extruded parts, and ability to coextrude with heat sensitive material that generally cannot be processed at conventional polycarbonate molding temperatures.

Melt processable copolyester-carbonates having relatively high glass transition temperatures (on the order of 180° C. or more) are described in the U.S. Pat. No. 4,310,652 (DeBons et al., Jan. 12, 1982). The term "low glass transition temperature" 1982). The term "low glass transition temperature" or "reduced Tg" as used in the present invention means a Tg of less than 145° C.

The U.S. Pat. No. 4,621,132 (Quinn et al., Nov. 4, 1986) describes branched copolyester-carbonate resins, including resins randomly branched with trisphenol branching agents. The resins are prepared from an aromatic ester precursor (isophthaloyl dichloride).

SUMMARY OF THE INVENTION

The invention comprises a blow-moldable, thermoplastic, branched copolyester-carbonate having a polymer backbone made up of recurring carbonate structural units of the formula:

(I)

wherein D is a divalent aromatic radical residue of the dihydric phenol employed in the preparative polymerization reaction; and repeating or recurring carboxylic chain units of the formula:

(II)

wherein n is a whole number integer of from 4 to 12, preferably 8 to 10;

said units of the formulae (I) and (II) being occasionally and randomly separated by branch moieties of the formula:

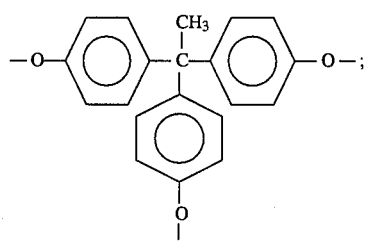

(III)

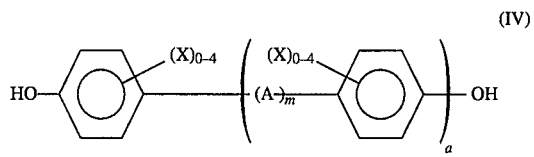

(IV)

said copolyester-carbonate exhibiting non-Newtonian behavior when thermally plasticized. The copolyester-carbonate resins of the invention exhibit a reduced Tg, i.e.; a low glass transition temperature.

The invention also comprises articles blow-molded from compositions of the invention. The articles of the invention are useful as bottles, tool and instrument housings, automotive structural components and the like.

DETAILED DESCRIPTION OF THE PREFERRED EMBODIMENTS OF THE INVENTION

Blow Moldable, branched copolyester-carbonate resins of the invention may be prepared by reacting a dihydric phenol and an ester precursor with a carbonate precursor, such as phosgene, and the branching agent 1,1,1-tris-(4-hydroxyphenyl)-ethane (hereinafter referred to at times for convenience as "THPE"). The method of preparation may be a well known method; see for example the interfacial polymerization method described in U.S. Pat. Nos. 3,169,121 and 4,487,896 which are herein incorporated by reference thereto.

Although the reaction conditions of the preparative processes may vary, several of the preferred processes typically involve dissolving or dispersing the dihydric phenol and polyfunctional organic compound reactants in aqueous caustic, adding the resulting mixture to a suitable water immiscible solvent medium and contacting the reactants with the carbonate precursor, such as phosgene, in the presence of a suitable catalyst and under controlled pH conditions. The most commonly used water immiscible solvents include methylene chloride, 1,2-dichloroethane, chlorobenzene, toluene, and the like.

The catalyst employed accelerates the rate of polymerization of the dihydric phenol reactant with the carbonate precursor. Representative catalysts include but are not limited to tertiary amines such as triethylamine, quaternary phosphonium compounds, quaternary ammonium compounds, and the like. The preferred process for preparing resins of the invention comprises a phosgenation reaction. The temperature at which the phosgenation reaction proceeds may vary from below 0° C., to above 100° C. The phosgenation reaction preferably proceeds at temperatures of from room temperatures (25° C.) to 50° C. Since the reaction is exothermic, the rate of phosgene addition may be used to control the reaction temperature. The amount of phosgene required will generally depend upon the amount of polyfunctional organic reactant compounds present.

The dihydric phenols employed are known, and the reactive groups are the two phenolic hydroxyl groups. Some of the dihydric phenols are represented by the general formula:

wherein A is a divalent hydrocarbon radical containing from 1 to about 15 carbon atoms; a substituted divalent hydrocarbon radical containing from 1 to about 15 carbon atoms and substituent groups such as halogen; —S—; —S—S—; —S(=O)—; —S(=O)$_2$; —O—: or —C(=O)—; wherein each X is independently selected from the group consisting of hydrogen, halogen, and a monovalent hydrocarbon radical such as an alkyl group of from 1 to about 8 carbon atoms, an aryl group of from 6–18 carbon atoms, an aralkyl group of from 7 to about 14 carbon atoms, an alkaryl group of from 7 to about 14 carbon atoms, an alkoxy group of from 1 to about 8 carbon atoms, or an aryloxy group of from 6 to 18 carbon atoms; and wherein m is zero or 1 and a is an integer of from 0 to 5.

Typical of some of the dihydric phenols that can be employed in the practice of the present invention are bisphenols such as (4-hydroxyphenyl)methane, 2,2-bis(4-hydroxyphenyl)propane (also known as bisphenol-A), 2,2-bis(4-hydroxy-3,5-dibromophenyl)propane; dihydric phenol ethers such as bis(4-hydroxyphenyl) ether, bis (3,5-dichloro-4-hydroxyphenyl) ether; dihydroxydiphenyls such as p,p'-dihydroxydiphenyl, 3,3'-dichloro-4,4'-dihydroxydiphenyl; dihydroxyaryl sulfones such as bis(4-hydroxyphenyl) sulfone, bis (3,5-dimethyl-4-hydroxyphenyl) sulfone, dihydroxybenzenes such as resorcinol, hydroquinone, halo- and alkyl-substituted dihydroxybenzenes such as 1,4-dihydroxy-2,5-dichlorobenzene, 1,4-dihydroxy-3-methylbenzene; and dihydroxydiphenyl sulfides and sulfoxides such as bis(4-hydroxyphenyl) sulfide, bis(4-hydroxyphenyl) sulfoxide and bis((3,5-dibromo-4-hydroxyphenyl) sulfoxide. A variety of additional dihydric phenols are available and are disclosed in U.S. Pat. Nos. 2,999,835; 3,028,365 and 3,153,008; all of which are incorporated herein by reference. It is, of course, possible to employ two or more different dihydric phenols or a combination of a dihydric phenol with glycol.

The carbonate precursor can be either a carbonyl halide, a diarylcarbonate or a bishaloformate. The carbonyl halides include carbonyl bromide, carbonyl chloride, and mixtures thereof. The bishaloformates include the bishaloformates of dihydric phenols such as bischloroformates of 2,2-bis( 4-hydroxyphenyl)propane, 2,2-bis(4-hydroxy-3,5-dichlorophenyl)propane, hydroquinone, and the like, or bishaloformates of glycols such as bishaloformates of ethylene glycol, and the like. While all of the above carbonate precursors are useful, carbonyl chloride, also known as phosgene, is preferred.

The ester precursor employed in the preparation of the copolyester-carbonate resins of the invention is a dicarboxylic acid of the general formula:

$$\text{HOOC - R}^1\text{ - COOH} \qquad (V)$$

wherein $R^1$ represents alkylene of 6 to 12 carbon atoms inclusive. Representative of the dicarboxylic acids of the formula V are decanedioic acid, undecanedioic acid, dodecanedioic acid and the like.

Mixtures of these dicarboxylic acids may be employed. Therefore, where the term dicarboxylic acid is used herein it is to be understood that this term includes mixtures of two or more dicarboxylic acids.

Rather than utilizing the dicarboxylic acid per se, it is possible, and sometimes even preferred, to employ the reactive derivatives of said acid. Illustrative of these reactive derivatives are the acid halides. The preferred acid halides are the acid dichlorides and the acid dibromides. Thus, for example instead of using dodecanedioic acid, it is possible to employ dodecanoyl dichloride and mixtures thereof. Other reactive derivatives are represented by the alkali metal salts of the dicarboxylic acids, such as the disodium salt of the acid (V).

Branching of the resin results from the inclusion of a polyfunctional organic compound, which is a branching agent. The polyfunctional organic compound employed in the present invention is 1,1,1-tris-(4-hydroxyphenyl) ethane, or its haloformyl derivative. The branching agent is used to make branched aromatic copolyester-carbonates having an IV of about 0.3 to 1.0 dl/g as measured in methylene chloride at 25° C. These branched copolyester-carbonates are substantially free of crosslinking.

In the preparation of the copolyester-carbonates of this invention, the amount of the branching agent which is reacted with the dihydric phenol and the carbonate precursor is critical to the extent that the amount employed must be sufficient to produce a true thermoplastic randomly branched resin which is substantially free of crosslinking. If an amount of branching agent employed is less than 0.01 mole percent, based upon the moles of the dihydric phenol employed, the resulting polymer will not exhibit the degree of non-Newtonian melt characteristics desired for blow molding and/or melt extrusion purposes. Preferably, it is desirable to employ 0.01 to about 3.0 and more particularly 0.01–1.0 mole percent of the branching agent, based upon the total moles of dihydric phenol.

In the most widely practiced polymerization process phosgene is introduced into an aqueous solution of the alkali metal salt of the dicarboxylic acid and the diphenol in methylene chloride in the presence of a phase-transfer catalyst as well as a molecular weight regulator, usually a monofunctional phenol.

The molecular weight regulators which can be employed in the interfacial process include monohydric phenols such as phenol, chroman-I [4-( 2,4,4-trimethylchromanyl)phenol], p-t-butyl phenol, 4-p-cumyl phenol and the like. Preferably, phenol or p-tert-butyl phenol are employed as the molecular weight regulator. An effective amount of a molecular weight regulator that will give modified melt flow value (KI) of 1,000 to 50,000 centiseconds, preferably from 5,000 to 30,000 centiseconds may be used. Generally, it is preferred to use from 2–5 mol %, and more preferably from 2.5–4.5 mol % of phenol as the molecular weight regulator.

The alkali metal salt of the dicarboxylic acid which can be employed in the polymerization process can be any of the alkali metal salts, selected from the groups consisting of the alkali group and the alkaline earth groups. Specifically, these include potassium, sodium, lithium, calcium, magnesium and like alkali metal salts.

The proportions of the other reactants employed to prepare the copolyester-carbonate resins of the invention will vary in accordance with the proposed use of the product resin. Those skilled in the art are aware of useful proportions, as described in the U.S. patents referred to above. In general, the amount of the ester bonds may be from about 3 to about 90 mole percent, relative to the carbonate bonds.

For example, 5 moles of bisphenol A reacting completely with 4 moles of dodecanoyl dichloride and 1 mole of phosgene would give a copolyester-carbonate of 80 mole percent ester bonds.

The preferred branched copolyester-carbonates for use in the present invention are those derived from bisphenol A and phosgene and having an intrinsic viscosity of 0.3 to 1.0 deciliters per gram, measured in methylene chloride at 25° C. In general, the preferred branched copolyester-carbonates of the invention are substantially free of cross-linking.

Additional embodiments of the invention include blends of thermoplastic molding compositions containing minor proportions (less than 50 percent by weight) of polycarbonate homopolymers in admixture with the copolyester-carbonate resins of the invention.

Polycarbonate homopolymer resins and their method of preparation by interfacial polymerization are well known; see for example the details provided in the U.S. Pat. Nos. 3,028,365; 3,334,154; 3,275,601; 3,915,926; 3,030,331; 3,169,121; 3,027,814; and 4,188,314, all of which are incorporated herein by reference thereto. In general, the method is as described above for preparing polyester-carbonates, but in the absence of an ester precursor.

Thermoplastic compositions of the invention may also be compounded by mixing the copolyester-carbonate resins of the invention with conventional molding aids such as, for example, antioxidants; antistatic agents; inert fillers such as glass, talc, mica, and clay; ultraviolet radiation absorbers such as the benzophenones, benzotriazoles, and the like; hydrolytic stabilizers such as the epoxides disclosed in U.S. Pat. Nos. 3,489,716, 4,138,379 and 3,839,247, all of which are incorporated herein by reference; impact modifiers and color stabilizers such as the organophosphites; thermal stabilizers such as phosphite; mold release agents and flame retardants. Some particularly useful flame retardants are the alkali and alkaline earth metal salts of sulfonic acids. These types of flame retardants are disclosed in U.S. Pat. Nos. 3,933,734; 3,931,100; 3,978,024; 3,948,851; 3,926,980; 3,919,167; 3,909,490; 3,953,396; 3,953,300; 3,917,559; 3,951,910 and 3,940,366, all of which are hereby incorporated herein by reference.

The following examples describe the manner and process of making and using the invention and set forth the best mode contemplated by the inventor for carrying out the invention but are not to be construed as limiting the scope of the invention. All parts are by weight. Test results are in accordance with the following test methods.

Heat Distortion Temperature Under Load (DTUL)

Determined according to ASTM D-648.

Notched Izod (NI)

Determined according to ASTM D-256 on 125 mil thick specimens.

Intrinsic Viscosity (I.V.)

The intrinsic viscosity was measured at a temperature of 25° C. in methylene chloride and is reported in deciliters/gram (dl/g).

Tensile Strengths and Elongation

ASTM Test Method D-638.

Flexural Yield and Modulus

ASTM Test Method D-790.

Melt Index Ratio (MIR)

ASTM Test Method D-1238 at 300° C., expressed in centiseconds. The Melt Index Ratio (MIR) is the ratio of melt flow rates at two different shear levels; see the method described in U.S. Pat. No. 4,415,722 at Col. 6, lines 1–7, incorporated herein by reference thereto.

Kasha Index (KI)

A measure of melt viscosity, by the method described in U.S. Pat. No. 4,735,978 (incorporated herein by reference thereto); results reported in centiseconds, measured at 6 min or, in part and at a temperature of 300° C.

Glass Transition Temperature (Tg) was determined by differential scanning calorimetry (DSC) using a DuPont 900 thermal analyzer and is reported as °C.

Dynatup Impact

Dynatup impact measurements were made in a Dynatup autoloader machine using 125 mil thick 10.16 cm discs. The tup impact velocity was 12.2 ft/sec giving an impact energy of 148 ft-lb. The average energy to maximum load of three measurements was reported.

Specific Gravity by ASTM test method D-792.

Yellowing Index (YI) was determined under accelerated aging conditions (QUV) by the test method ASTM D-1925. The test result is given in hours of light exposure after aging in a QUV Accelerated Weathering Tester with QVA 351 lamps. The cycle is 4 hours dark, 8 hours light. The change in yellowness was measured on an XL-835 colorimeter from Pacific Scientific Gardner Laboratory.

Molecular Weight ($M_w$)

The weight average molecular weight ($M_w$) was determined by gel permeation chromatography (GPC) in methylene chloride relative to polycarbonate standards using a UV detector at 254 nm.

EXAMPLES 1–3 and Control Examples 4 and 5

Copolymerization of Bisphenol-A, 1,1,1,-tris-(4-hydroxyphenyl)ethane and Dodecanedioic Acid Disodium Salt The disodium salt of dodecanedioic acid (DDDA) was prepared by dissolving the free acid (7.2 g, 31 mmol) and NaOH pellets (2.7 g, 68 mmol) in water (180 ml).

The following procedure was followed to prepare three batches of resin (Examples 1–3) of the invention, with varied proportions of branching agent.

A 2000 ml five neck Morton Flask equipped with a bottom outlet was fitted with a mechanical stirrer, a pH probe, an aqueous sodium hydroxide (50%) inlet tube, a Claisen adapter to which a dry ice condenser was attached, and a gas inlet tube. The flask was charged with bisphenol-A (BPA), (71 g, 311 mmol), a proportion of 1,1,1-tris-(4-hydroxyphenol)ethane, triethylamine (0.9 ml), p-cumylphenol (2.0 g, 9 mmol), methylene chloride (220 ml), and the disodium salt solution of DDDA prepared above. Then phosgene was introduced at a rate of 2 g/min, while the pH was maintained at 8 by addition of caustic for 10 minutes; the pH was then raised and maintained at around 11 while phosgene addition continued for 10 additional minutes. The total amount of phosgene added was 40 g (400 mmol). The pH was adjusted to 11–11.5 and the organic phase was separated from the brine layer and washed with 2% hydrochloric acid (3×300 ml), and with deionized water (5×300 ml).

The product copolymers were removed from the purified organic solution by steam precipitation. The wet powder so obtained was dried in a Vertimix dryer.

The proportions of 1,1,-tris-(4-hydroxyphenyl) ethane branching agent used and the physical properties associated with the product resins are set forth in the Table 1, below. The first batch (Example 1) was prepared without inclusion of branching agent as a comparative control. The Examples 4 and 5 are not examples of the invention, but are presented as comparative controls.

TABLE 1

| Example | Diacid (mol %) | THPE[a] (mol %) | IV (dl/g) | Powder KI (@ 300° C.) | Tg (°C.) |
|---|---|---|---|---|---|
| 1 (Control) | 9 | 0 | 0.58 | 3050 | 127 |
| 2 | 9 | 0.37 | 0.57 | 4980 | 128 |
| 3 | 9 | 0.36 | 0.58 | 4770 | 127 |
| 4 (Control) | 0 | 0 | 0.58 | 6000 | 148 |
| 5 (Control) | 0 | .37 | 0.58 | 12000 | 148 |

[a]Determined by HPLC analysis of hydrolysis products, based on (mol THPE)/(mol BPA + mol DDDA).

As shown in Table 1, above, the effect of incorporating the aliphatic diacid into the polymer chain results not only in a polymer having a lower Tg, but also in enhanced melt flow properties.

Examples 6–11

Following the general procedure of Examples 1–3, supra., six additional batches of resin product were prepared, using 0.36 mole percent of the 1,1,1-tris-(4-hydroxyphenyl) ethane branching agent. The formulation was preequilibrated with 0.5 gallons of 50 weight percent sodium hydroxide solution. After a five minute pre-equilibration time, the phosgene flow was started and maintained for 40 to 41 minutes. Each batch of resin product was tested and characterized as described in Table 2 below. The yellowness indices of each batch was about 2 to 2.5.

TABLE 2

| Example | IV | Mw | Powder KI (@ 300° C.) | Tg (°C.) |
|---|---|---|---|---|
| 6 | 0.64 | 36300 | 7740 | 129 |
| 7 | 0.65 | 37500 | 10690 | 128 |
| 8 | 0.63 | 35700 | 9250 | 128 |
| 9 | 0.65 | 34400 | 6760 | 127 |
| 10 | 0.61 | 32300 | 4870 | 127 |
| 11 | 0.61 | 31200 | 3900 | 127 |

The resin obtained in Example 11, supra. was compounded in three different molding formulations (Examples 12–14).

The first formulation, Example 12, contained an antioxidant, Irgafos® 168 (0.05 phr) made by Ciba-Geigy Corp.® and QUANTUM 3004 (formerly EMERY 3004) a polyalphaolefin mold release agent (0.5 ml/100 g) available from Emery Chemical Co. The other two formulations (Examples 13 and 14) also contained OCF 415CA chopped glass fibers Owens-Corning Fiberglass Co. at 4.6 and 10% by weight levels respectively. A filler proportion of glass is generally within the range of from 1 to 20 percent by weight, preferably 1 to 15 percent, of the molding composition.

The three formulations were profile extruded for a window glazing bead application. The branched copolyester-carbonate formulations were compared to branched polycarbonate homopolymer in the development of thermoplastic materials to be used for window seal profile. As expected, the Example 12. shows extrusion at lower temperatures than polycarbonate homopolymer; it also extruded with reduced torque, increased center flow in a channel die, and a smoother surface. Superior impact strength was also observed.

The glass filled formulations could also be extruded at lower temperature than polycarbonate homopolymer. Upon testing of the formulations using the copolyester-carbonates of Examples 12–14, the following test results were obtained as shown in Table 3, below.

TABLE 3

| Example | 12 | 13 | 14 |
|---|---|---|---|
| Glass Content | 0 | 4.6 | 10.0 |
| KI 6 @ 300° C. (csec) | 5410 | — | — |
| MIR* | 2.0 | 2.4 | 2.3 |
| Notched Izod (J/m) | 886 (100%)** | 112 (0%)** | 197 (60%)** |
| Dynatup (J) | 65 | 41 | 35 |
| Tens. Strength (Y-MPa) | 63 | 64 | 65 |
| Tens. Strength (B-MPa) | 61 | 48 | 48 |
| Tens. Elongation (%) | 80 | 9 | 5 |
| Flex. Strength (Y-MPa) | 92 | 98 | 104 |
| Flex. Modulus (MPa) | 2262 | 2788 | 3476 |
| DTUL @ 1.8 MPa (°C.) | 111 | 112 | 113 |
| Specific Gravity | 1.18 | 1.22 | 1.25 |

*The melt index ratio (MIR) values of linear Newtonian polycarbonate homopolymers are typically less than 1.4 while those of branched polycarbonate homopolymers are typically higher than 1.5.
**Values in parenthesis indicate the percentage of specimens exhibiting ductility at break.

Example 15

The general procedure of Example 1 given above was repeated, except that the dodecanedioic acid as used therein was replaced with 10 mol % sebacic acid, and the proportion of THPE used was 0.4 mol %.

The following properties were observed upon testing the resin product:

| | |
|---|---|
| IV | 0.45 |
| KI6 (centiseconds) | 1910 |
| KI part | 1850 |
| Notched Izod (J/m) | 640 (100% ductility) |
| Dynatup (J) | 50 (100% ductility) |
| Tensile Y (MPa) | 61 |
| Tensile B (MPa) | 52 |
| Tensile E (MPa) | 0.5 |
| Flex Y (MPa) | 92 |
| Flex Mod (MPa) | 2245 |
| Tg (°C.) | 132 |
| DTUL @ 1.8 MPa (0° C.) | 113 |

The desired non-Newtonian behavior is evident.

Examples 16–19

A series of resin batches were prepared as follows:

To a 150 gallon, glass-lined, agitated formulation tank was added DDDA (20 lbs, 39.1 mol), deionized water (40 gal), and 50 weight percent caustic (1.2 gal, 85.2 mol). The slurry was agitated for twenty minutes to ensure complete dissolution of the DDDA. The remainder of the batch was then formulated with BPA (200 lbs, 398 mol), THPE (1.09 lbs, 1.6 mol; or 1.62 lbs, 2.4 mol), deionized water (20 gal), methylene chloride (52 gal), sodium gluconate (0.36 lbs), 90 weight percent phenol/water mixture (3.0 lbs), and triethylamine (1120 mL, 800 grams or 2 mol % based on BPA). The mixture was agitated and then transferred to a phosgenation reactor. A 20 gallon methylene chloride flush of the formulation tank was also sent to the reactor. Once the formulation reached the 300 gallon glass-lined reactor, phosgene flow was started. A phosgene flowrate of 300 pounds per hour was maintained for 23 minutes. The pH of the solution was held at 8 to 8.5 by the addition of sodium hydroxide as a 50 weight percent solution in water until 65 pounds of phosgene had been added. Over the next five minutes, the pH was raised to 10.5 and held until 115 pounds of phosgene were transferred to the reactor. The phosgene flow was stopped when the totalizer reached 115 pounds. The excess phosgene was depleted from the reactor and a sample was taken for residual BPA analysis. The reaction solution was purified, isolated and dried by the processes described in Examples 1–3, supra.

Physical properties observed for the resins prepared are given in the Table 4, below.

TABLE 4

| Example | IV | Mw | THPE (mol %)a | KI (300° C.) | Tg (°C.) |
|---|---|---|---|---|---|
| 16 | 0.60 | 35000 | 0.26 | 9100 | 128 |
| 17 | 0.58 | 34000 | 0.33 | 6500 | 127 |
| 18 | 0.58 | 34000 | 0.31 | 6300 | 127 |
| 19 | 0.61 | 37800 | 0.44 | 10600 | 129 | aDetermined by HPLC analysis of hydrolysis products, based on (mol THPE)/(mol BPA + mol DDDA).

The resins prepared in Examples 17 and 18 were compounded with Quantum® mold release agent, supra., (0.5 ml/100 g) and extruded as in Examples 12–14, supra. Upon testing, the physical properties shown in Table 5, below, were observed.

TABLE 5

| Example | 17 | 18 |
|---|---|---|
| KI 6 @ 300° C. (csec) | 5700 | 11,000 |
| Notched Izod (J/m) | 694 (100%)* | 534 (60%)* |
| Dynatup (J) | 65 | 57 |
| Tens. Strength (Y-MPa) | 63 | 63 |
| Tens. Strength (B-MPa) | 65 | 49 |
| Tens. Elongation (%) | 0.6 | 0.2 |
| Flex Strength (Y-MPa) | 89 | 89 |
| Flex. Modulus (MPa) | 2157 | 2162 |
| DTUL @ 1.8 MPa (°C.) | 112 | 108 |

*percentage of specimens ductile at break.

The formulations of Examples 17 and 18 exhibited non-Newtonian behavior.

What is claimed is:

1. A thermoplastic, branched copolyester-carbonate having a polymer backbone of recurring carbonate structural units of the formula:

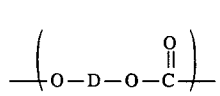

(I)

wherein D is a divalent aromatic radical residue of the dihydric phenol employed in the preparative polymerization reaction; and repeating or recurring carboxylic chain units of the formula:

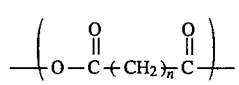

(II)

wherein n is a whole number integer of from 4 to 12;
said units of the formulae (I) and (II) being randomly separated by branch moieties of the formula:

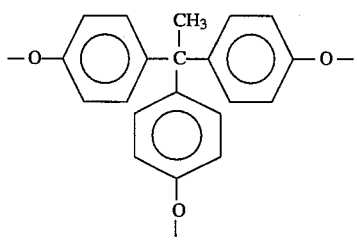

said copolyester-carbonate having an intrinsic viscosity of about 0.3 to 1.0 dl/g as measured in methylene chloride at 25° C., exhibiting non-Newtonian behavior when thermally plasticized and having a glass transition temperature of less than 145° C.

2. The copolyester-carbonate of claim 1 wherein n is 8.

3. The copolyester-carbonate of claim 1 wherein n is 10.

4. The copolyester-carbonate of claim 1 having an intrinsic viscosity within the range of from 0.3 to 1.0.

5. A thermoplastic molding composition which comprises;
the copolyester-carbonate of claim 1; and a filler proportion of glass fiber.

6. An article molded from the copolyester-carbonate of claim 1.

7. The branched copolyester-carbonate of claim 1 wherein D represents the divalent radical of formula:

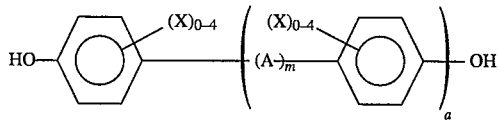

wherein A is a divalent hydrocarbon radical containing from 1 to about 15 carbon atoms; or a substituted divalent hydrocarbon radical containing from 1 to about 15 carbon atoms and substituent groups such as halogen; —S—; —S—S—; —S(=O)—; —S(=O)$_2$—; —O—; or —C(=O)—;
wherein each X is independently selected from the group consisting of hydrogen, halogen, and a monovalent hydrocarbon radical selected from the group consisting of an alkyl group of from 1 to about 8 carbon atoms, an aryl group of from 6–18 carbon atoms, an aralkyl group of from 7 to about 14 carbon atoms, an alkaryl group of from 7 to about 14 carbon atoms, an alkoxy group of from 1 to about 8 carbon atoms, or an aryloxy group of from 6 to 18 carbon atoms; and wherein m is zero or 1 and n is an integer of from 0 to 5.

8. The copolyester-carbonate of claim 7 wherein A represents propylene, X is hydrogen, m is 1 and a is 1.

9. A thermoplastic, branched copolyester-carbonate having a polymer backbone of recurring carbonate structural units of the formula:

wherein D is a divalent aromatic radical residue of the dihydric phenol employed in the preparative polymerization reaction; and repeating or recurring carboxylic chain units of the formula:

wherein n is a whole number integer of from 4 to 12;
said units of the formulae (I) and (II) being randomly separated by branch moieties of the formula:

$$-\text{TRISPHENOL}-$$

said copolyester-carbonate having an intrinsic viscosity of about 0.3 to 1.0 dl/g as measured in methylene chloride at 25° C. and a glass transition temperature of less than 145° C. whereby the copolyester-carbonate is blow moldable.

10. The copolyester-carbonate of claim 1 wherein n is a whole number integer from 8 to 10.

* * * * *